（12）United States Patent
Höller et al.

(10) Patent No.: US 12,021,442 B2
(45) Date of Patent: Jun. 25, 2024

(54) METHOD FOR OPERATING A MULTILEVEL CONVERTER

(71) Applicant: B&R INDUSTRIAL AUTOMATION GMBH, Eggelsberg (AT)

(72) Inventors: Florian Höller, Eggelsberg (AT); Franz Maislinger, Eggelsberg (AT); Jonas Wyss, Eggelsberg (AT); Armin Steinhauser, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 200 days.

(21) Appl. No.: 17/843,038

(22) Filed: Jun. 17, 2022

(65) Prior Publication Data
US 2022/0407408 A1 Dec. 22, 2022

(30) Foreign Application Priority Data

Jun. 18, 2021 (AT) .............................. A50495/2021

(51) Int. Cl.
*H02M 1/12* (2006.01)
*H02M 1/00* (2006.01)
*H02M 3/158* (2006.01)

(52) U.S. Cl.
CPC ........... *H02M 1/12* (2013.01); *H02M 1/0095* (2021.05); *H02M 3/158* (2013.01)

(58) Field of Classification Search
CPC ....... H02M 1/12; H02M 1/0095; H02M 3/158
See application file for complete search history.

(56) References Cited

U.S. PATENT DOCUMENTS

| 9,559,541 B2* | 1/2017 | Cheng ..................... H02M 1/36 |
| 2011/0280052 A1* | 11/2011 | Al-Haddad ........... H02M 7/483 363/84 |

(Continued)

FOREIGN PATENT DOCUMENTS

| EP | 2 784 926 | 10/2014 |
| EP | 3 236 576 | 10/2017 |

OTHER PUBLICATIONS

Thielemans et al., "Balancing and Harmonic Analysis of Flying Capacitor Multilevel Converters", 2008 IEEE 25th Convention of Electrical and Electronics Engineers in Israel, XP031399480, Dec. 3, 2008, pp. 609-613.

(Continued)

*Primary Examiner* — Rafael O De Leon Domenech
(74) *Attorney, Agent, or Firm* — GREENBLUM & BERNSTEIN, P.L.C.

(57) ABSTRACT

A method for operating a multilevel converter in flycap topology, in which the multilevel converter has at least two semiconductor switches controlled by control pulses of variable pulse durations within a control period that recurs at a control frequency to selectively interconnect a voltage source connected to an input of the multilevel converter, an output of the multilevel converter, and at least one auxiliary capacitor arranged between the input and the output, for generating an output voltage. The method includes using at least one oscillation parameter that describes the oscillation behavior of at least one harmonic of an electrical measured variable, at least one correction pulse duration is determined for a future control pulse to reduce the amplitude of the at least one harmonic and at least one semiconductor switch is controlled with a control pulse of the determined correction pulse duration.

10 Claims, 7 Drawing Sheets

(56) References Cited

U.S. PATENT DOCUMENTS

| | | | | |
|---|---|---|---|---|
| 2013/0014384 | A1* | 1/2013 | Xue | H02M 7/4835 |
| | | | | 29/825 |
| 2017/0099013 | A1* | 4/2017 | Martini | H02M 7/487 |
| 2017/0201177 | A1* | 7/2017 | Kesarwani | H02M 1/14 |
| 2017/0214309 | A1 | 7/2017 | Yoscovich et al. | |
| 2021/0067057 | A1* | 3/2021 | Abarzadeh | H02M 7/4837 |

OTHER PUBLICATIONS

Hosseini et al., "Estimation of Flying Capacitors Voltages in Multicell Converters", 2009 6th International Conference on Electrical Engineering/Electronics, Computer, Telecommunications and Information Technology (ECTI-CON), XP031480957, May 6, 2009, pp. 110-113.

Xu et al., "Active Capacitor Voltage Control of Flying Capacitor Multilevel Converters", IEE Proceedings Electric Power Applications, vol. 151, No. 3, ISSN 1350-2352, XP006021708, Feb. 13, 2004, pp. 313-320.

Aquilera et al., "Capacitor Voltage Estimation for Predictive Control Algorithm of Flying Capacitor Converters", 2009 IEEE International Conference on Industrial Technology (ICIT), XP031456968, Feb. 10, 2009, pp. 1-6.

Austria Search Report conducted in counterpart Austria Patent Application No. A 50495/2021 (dated Jun. 18, 2021).

\* cited by examiner

METHOD FOR OPERATING A MULTILEVEL CONVERTER

CROSS-REFERENCE TO RELATED APPLICATION

This application claims priority under 35 U.S.C. § 119(a) to Austria Application No. A50495/2021 filed Jun. 18, 2021, the disclosure of which is expressly incorporated by reference herein in its entirety.

BACKGROUND

1. Field of the Invention

The present invention relates to a method for operating a multilevel converter in flycap topology. In the multilevel converter, at least two semiconductor switches are controlled by control pulses of variable pulse durations within a control period that recurs at a control frequency, in order to selectively interconnect a voltage source connected to an input of the multilevel converter, an output of the multilevel converter, and at least one auxiliary capacitor arranged between the input and the output of the multilevel converter, for generating an output voltage of the multilevel converter. An auxiliary voltage is formed on the at least one auxiliary capacitor and at least one electrical voltage or at least one electrical current are measured as an electrical measured variable at a point which is electrically connected to the output of the multilevel converter.

2. Discussion or Background Information

Power converters, such as rectifiers, inverters, and converters, are increasingly playing key roles in a wide variety of technological fields. Feeding solar energy into the grid, high-voltage direct current transmission, or automotive test bench technology are only a few examples in this respect, in which the amplitude, frequency, and phase of currents and voltages have to be adapted to specified target values using suitable power converters while complying with high accuracy requirements. Although the field of power converter technology has been a subject that has been intensively researched in this context for a long time, the demands for greater control accuracy combined with high rates of change over time of target variables to be followed, lower residual ripple in the electrical output variables generated, smaller sizes of the power converters used, and reduced costs, constantly result in new technological Challenges.

Multilevel converters in particular represent a promising approach to meeting the requirements mentioned that attracts a lot of attention. Multilevel converters are known in various designs and topologies. A multilevel converter comprises a switching stage having a plurality of semiconductor switches, wherein a multilevel converter is able to generate more than two voltage levels at the output of the switching stage. In one possible embodiment, multilevel converters are constructed from a plurality of semiconductor switches which, depending on the specific embodiment, are connected in different ways to a plurality of capacitors referred to as auxiliary capacitors. The auxiliary capacitors, which are substantial for the functional principle of such a multilevel converter, usually serve to provide a plurality of voltage levels corresponding to their number. Commonly, and also in the course of the following explanations, the auxiliary capacitors mentioned are also referred to as "flying capacitors" or "flycaps" for short. In this sense, a multilevel converter of this type is also referred to as a "flycap multilevel converter" or "multilevel converter in flycap topology." In the course of the subsequent explanations, flycap multilevel converters and multilevel converters in flycap topology will be discussed in more detail, whereby the term "multilevel converter" is simply used synonymously instead of these terms for better readability. In contrast, the designation "auxiliary voltage" is common for the voltages dropping across the auxiliary capacitors.

To supply a multilevel converter, a voltage source is usually connected between two points in the circuit topology thereof; although in this case the specific design can also vary depending on the application. Points for connecting a voltage source are referred to as inputs of a multilevel converter. In the case of inverters, DC voltage sources are common for voltage sources; in the case of frequency converters, such as those used to operate electrical machines, the supply usually takes place using an intermediate circuit that provides a DC voltage and can itself be supplied by a rectifier supplied with AC voltage. In particular, points in the circuit topology thereof at which a generated output variable is tapped and/or at which further electrical equipment can be connected are taken under consideration as outputs of a multilevel converter.

A large number of different connection paths between the voltage source, the auxiliary capacitors, and the output of the multilevel converter can typically be implemented by suitably controlling the semiconductor switches of a multilevel converter. The voltage source, the auxiliary capacitors, and the output of the multilevel converter can thus be selectively interconnected in various ways, as a result of which a large number of different output voltage levels can be provided in comparison to conventional converters. Multilevel converters can therefore also be understood as switches that switch selectively between a plurality of voltage levels made available to them by the auxiliary capacitors. For this reason in particular, the 2-level converter, which is well known from power converter technology, is not considered a multilevel converter in the sense of the present explanations.

If, as is usual in power converter technology, the well-known method of pulse width modulation (PWM) is used to generate the required electrical output variables, the majority of voltage levels available in multilevel converters can often be used advantageously. In a PWM, in the present context, output voltage pulses of variable pulse durations are output by a multilevel converter in order to realize a mostly predetermined voltage-time area within a PWM period that recurs at the frequency of the PWM, which period is also referred to below as a control period that recurs at a control frequency. A voltage-time area generated in this way is usually required to correspond as exactly as possible to that voltage-time area that a desired output voltage curve would generate in the same control period. Due to the higher number of voltage levels, in the case of multilevel converters, it is possible in many cases to apply voltage levels which are closer to a specified target value of an output voltage, which can result in a number of practical advantages.

In contrast to conventional 2-level converters, multilevel converters offer the advantage of a more fine-grained voltage generation. In addition, the frequency of the dominant harmonic of a generated output variable, often referred to as the "fundamental tone", is usually an integral multiple greater than the switching frequency of the individual semiconductor switches. In this case, harmonics are understood to be harmonic partial oscillations of a generated output variable, the frequency of which is generally an integral multiple of the control frequency. The output filters that are usually required for a mains connection can be made much more compact compared to 2-level converters, which in particular allows smaller filter chokes and thus results in a lower overall space requirement and reduced costs. In addition, the switching load of the individual semiconductor switches can be reduced by means of suitable control strategies for the semiconductor switches with an increasing number of voltage levels, which has particular advantages in terms of wear and maintenance of these components.

Despite the advantages mentioned, multilevel converters in flycap topology are not yet widespread on the market. The reason for the improvable market penetration of multilevel converters is a series of problems in their practical use that have not yet been satisfactorily solved. Examples of this are in particular the specification of modular operating strategies which are scalable with the number of voltage levels, as well as the control of the auxiliary voltages dropping across the auxiliary capacitors. The control of the auxiliary voltages dropping across the auxiliary capacitors usually serves the purpose of keeping the auxiliary voltages constant at predetermined target or default values during operation. Since the design of operating strategies for multilevel converters is usually based on constant auxiliary voltages with target values that are also advantageous, a drift in auxiliary voltages can result in serious disadvantages during operation.

Another reason for the desire for constant auxiliary voltages results from the so-called "harmonic distortion" of output variables generated. In this context, harmonic distortion means the increased occurrence of harmonics in the output variables generated by a multilevel converter, which are primarily caused by auxiliary voltages that deviate from their target values and/or that change during operation. A harmonic distortion of this type is disadvantageous in a wide variety of applications, from power supply to test bench operation, and is therefore clearly undesirable. For the reasons mentioned, the control task of keeping auxiliary voltages constant, which is often referred to in the following explanations as "balancing the auxiliary capacitors" or "balancing the auxiliary voltages," is of decisive importance and is also known in the prior art.

In this context, US 2017/0214309 A describes an operating strategy for a multilevel converter in flycap topology. It refers in particular to the costs, the efficiency, and the switching losses of the multilevel converter under consideration, but also describes the need to balance the auxiliary voltages dropping across the auxiliary capacitors, which means that the auxiliary voltages dropping across the auxiliary capacitors are to be kept at specified target values. The document cited mentions that adapting the pulse durations of the control pulses used to drive the semiconductor switches provided in the multilevel converter can represent a suitable means for this. However, US 2017/0214309 A does not mention in detail how such an adaptation of the pulse durations of the control pulses can take place.

It is evident from the cited prior art that maintaining predetermined auxiliary voltages at the auxiliary capacitors represents one of the key tasks during operation of multilevel converters. In real operation, however, the auxiliary voltages can malfunction for a number of reasons. Since, for obvious reasons, the auxiliary capacitors are electrically charged and discharged when the semiconductor switches are opened and closed, the component variation that is always present in the semiconductor switches can already be a cause of auxiliary voltages that deviate from their target values. Electrical loads on a flycap multilevel converter that change over time can also affect the auxiliary voltages in this context. In cases of this type, the auxiliary capacitors can also be charged and discharged to different extents at different points in time due to a time-varying load on the multilevel converter, which can result in a direct and often particularly disadvantageous effect on the given auxiliary voltages.

Although the problem of balancing auxiliary capacitors is a problem known in the prior art, the approaches proposed there often have significant disadvantages. The approach that is often put forward, of measuring the auxiliary voltages present in a multilevel converter in order to then use these measured values for control of the auxiliary voltages, usually results in a large outlay in terms of sensors, circuitry, and signal processing. In many cases, measurements of this type also require the auxiliary voltages of interest to be sampled at extremely high sampling rates, which often precludes the implementation of measurements of this type from the outset. In order to help multilevel converter technology to achieve a breakthrough, it therefore seems particularly important to establish efficient operating strategies for multilevel converters that make it possible to avoid a disturbed balance of the auxiliary voltages without using complex sensors.

SUMMARY

Embodiments improve the operation of multilevel converters. In particular, a method is to be specified that is reliable and easy to implement and which makes it possible to keep the auxiliary voltages dropping across the auxiliary capacitors constant and thus to balance them.

According to embodiments, a multilevel converter in flycap topology, in which multilevel converter at least two semiconductor switches are controlled by control pulses of variable pulse durations within a control period that recurs at a control frequency, in order to selectively interconnect a voltage source connected to an input of the multilevel converter, an output of the multilevel converter, and at least one auxiliary capacitor arranged between the input and the output of the multilevel converter, for generating an output voltage of the multilevel converter. An auxiliary voltage is formed on the at least one auxiliary capacitor for generating an output voltage of the multilevel converter. To carry out the method according to embodiments, it is sufficient to measure only one electrical voltage and/or only one electrical current at the output of the multilevel converter or at a point electrically connected to the output of the multilevel converter as an electrical measured variable.

Based on this, the core of the present invention is formed in particular by parameters referred to as "oscillation parameters" which describe the oscillation behavior, for example, the frequency and/or the amplitude and/or the phase position, of harmonics of the measured electric output variable. The frequencies of these harmonics correspond in this case to integral multiples of the control frequency of the multilevel converter. Within the scope of the present invention, it was surprisingly found that the harmonics of electrical output variables of a multilevel converter and thus the oscillation parameters mentioned are remarkably related to the auxiliary voltages dropping across the auxiliary capacitors of the multilevel converter. This astonishing relationship is used within the scope of the present invention to balance the auxiliary voltages and has the consequence, in a particularly advantageous manner, that the given auxiliary voltages can be balanced by suppressing harmonics in an output variable of the multilevel converter.

Using at least one oscillation parameter to describe at least one harmonic of an electrical output variable, at least one correction pulse duration is determined in this sense, which serves the purpose of reducing the amplitude of the at least one harmonic under consideration. In order to achieve the goal according to the invention of balancing the auxiliary voltages, at least one semiconductor switch is subsequently controlled with a control pulse of the determined correction pulse duration.

The relationship between the harmonics of electrical output variables of a multilevel converter and the auxiliary voltages dropping across its auxiliary capacitors represents the basis for a whole series of further advantageous embodiments of the present invention. In an advantageous embodiment, estimated values for the auxiliary voltages dropping across the auxiliary capacitors can be determined from the oscillation parameters determined, and their deviations from the target values specified for the estimated auxiliary voltages can be determined. The correction pulse durations mentioned can be determined from these deviations using a wide variety of methods from control engineering.

Embodiments of the method can be used in any control electronics (analog/digital) for multilevel converters with switched auxiliary capacitors. The specific number of auxiliary capacitors is irrelevant for use of the method according to the invention, and the specific implementation of the auxiliary capacitors is also irrelevant in this context. Thus, in a multilevel converter in which the method according to the invention is applied, auxiliary capacitors can be used which differ, for example, in their design and/or in their size and/or in their capacitance. The specific topology of a multilevel converter also does not restrict the use of the method according to the invention.

Embodiments are directed to a method for operating a multilevel converter in flycap topology. The multilevel converter has at least two semiconductor switches controlled by control pulses of variable pulse durations within a control period that recurs at a control frequency to selectively interconnect a voltage source connected to an input of the multilevel converter, an output of the multilevel converter, and at least one auxiliary capacitor arranged between the input and the output of the multilevel converter, for generating an output voltage of the multilevel converter, such that an auxiliary voltage is formed on the at least one auxiliary capacitor and at least one electrical voltage or at least one electrical current is measured as an electrical measured variable at a point that is electrically connected to the output of the multilevel converter. The method includes using at least one oscillation parameter derived from the electrical measured variable, the oscillation parameter describing oscillation behavior of at least one harmonic of the electrical measured variable and a frequency of the harmonic corresponding to an integral multiple of the control frequency; determining at least one correction pulse duration for a future control pulse to reduce an amplitude of the at least one harmonic; and controlling at least one of the semiconductor switches with a control pulse of the determined correction pulse duration.

According to embodiments, to determine the at least one correction pulse duration from the at least one oscillation parameter, the method may further include determining at least one estimated value of an auxiliary voltage dropping across the at least one auxiliary capacitor is determined; determining a deviation between the at least one estimated value and a target value that is specified for the auxiliary voltage described by the at least one estimated value. The determined deviation can be used to determine the at least one correction pulse duration. The at least one estimated value of the auxiliary voltage dropping across at least one auxiliary capacitor may be determined by solving a system of equations, in which the at least one oscillation parameter is taken into account as a known variable. Further, the determination of the at least one correction pulse duration based on the deviation between the at least one estimated value and the target value that is specified for the auxiliary voltage described by at least the one estimated value may take place by a control operator that maps the determined deviation to a controller output variable. At least one correction pulse duration can be determined from the controller output variable, where duration is assigned to at least one semiconductor switch provided in the multilevel converter, and the correction pulse duration determined can be subsequently used in order to control the at least one semiconductor switch.

In accordance with embodiments, the at least one correction pulse duration may be determined from the electrical measured variable using a convolution operation in which the electrical measured variable can be convolved with an impulse response derived from the at least one oscillation parameter.

In other embodiments, at least one of a frequency, an amplitude or a phase position of the at least one harmonic of the electrical measured variable can be determined as an oscillation parameter to describe the oscillation behavior of the at least one harmonic of the electrical measured variable. Further, the phase position of the at least one harmonic can describe a time shift of the at least one harmonic to a beginning of a control period.

According to still other embodiments, a frequency and/or, in accordance with an IQ method, two amplitudes of two signal components, which are phase-shifted by 90 degrees with respect to one another, of the at least one harmonic of the electrical measured variable may be determined as an oscillation parameter to describe the oscillation behavior of the at least one harmonic of the electrical measured variable.

Embodiments are directed to a multilevel converter in flycap topology having an input and an output. The multilevel converter includes at least two semiconductor switches, which are controllable by control pulses of variable pulse durations within a control period that recurs at a control frequency; at least one auxiliary capacitor selectively interconnected between the input and the output via the at least two semiconductor switches; and a voltage source connected to the input, the output and the at least one auxiliary capacitor for generating an output voltage, wherein an auxiliary voltage is formed at the at least one auxiliary capacitor, such that at least one electrical voltage or at least one electrical current as an electrical measured variable at a point which is electrically connected to the output is detectable. At least one oscillation parameter derived from the electrical measured variable, the at least one oscillation parameter describing an oscillation behavior of at least one harmonic of the electrical measured variable, where the frequency of the harmonic corresponds to an integral multiple of the control frequency, is used to determine at least one correction pulse duration for a subsequent control pulse to reduce an amplitude of the at least one harmonic and to control at least one of the semiconductor switches with the at least one control pulse with the determined correction pulse duration.

In accordance with still yet other embodiments, a control unit can be coupled to use the at least one oscillation parameter derived from the electrical measured variable to determine the at least one correction pulse duration for the future control pulse to reduce the amplitude of the at least one harmonic and to control the at least one of the semiconductor switches with the at least one control pulse with the determined correction pulse duration.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIG. 1 to 8, which, by way of example, show schematic and non-limiting advantageous embodiments of the invention. In the drawing.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
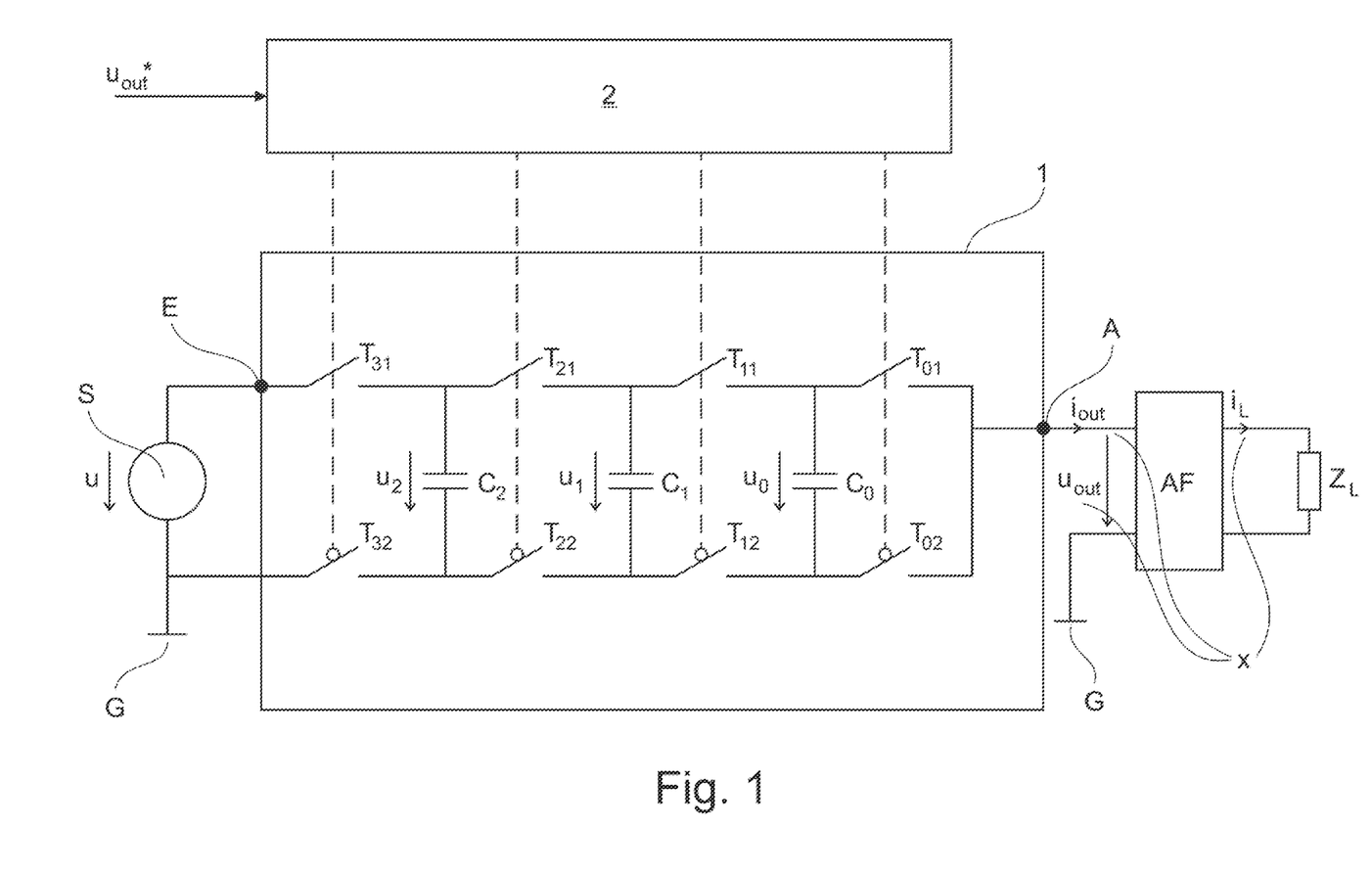
FIG. 1 is a schematic representation of a 5-level converter with an output filter.

FIG. 1 is a schematic representation of a 5-level converter 1 in flycap topology. In the situation shown, a voltage source S connected to the input E of the 5-level converter 1 supplies the 5-level converter 1 with the input voltage u. The input voltage u is preferably provided in the form of a DC voltage (DC supply). In this case, the voltage source S can be designed in particular as a rectifier or a DC intermediate circuit. However, it should be noted that an AC voltage source can also be used to implement the present invention, for example in the form of an inverter, which in turn is supplied by a rectifier, or in the form of a (frequency) converter. If a multilevel converter to which embodiments of the method are applied has a different topology, other connection points for a voltage source S and thus an input E are also conceivable. The 5-level converter 1 is in this case based on the reference potential G.

In addition to the voltage source S, three auxiliary capacitors $C_0$, $C_1$, $C_2$ are provided in the case shown, which provide the auxiliary voltages $u_0$, $u_1$, $u_2$ as shown. The number of auxiliary capacitors $C_0$, $C_1$, $C_2$ can be selected as desired with regards to the method according to the embodiments; a larger or smaller number of auxiliary capacitors is also conceivable, which can be connected to one another in a different way. However, at least one auxiliary capacitor is necessary. In order to connect the voltage source S, the auxiliary capacitors $C_0$, $C_1$, $C_2$, and the output A, the semiconductor switches $T_{01}, T_{02}, \ldots T_{31}, T_{32}$ are used in the situation shown, which are implemented in particular by transistors of various types, such as field effect transistors.

Controlling the semiconductor switches $T_{k1}$, $T_{k2}$ takes place, as is customary in semiconductor technology and power electronics, by electrical control pulses in the form of electrical voltages which typically have a fixed pulse height. However, the pulse widths or pulse durations $\tau_k$ of these control pulses can usually be changed and thus also in the present case can be adapted to the requirements of a given situation. A specific sequence of switching pulses for the semiconductor switches $T_{01}, T_{02}, \ldots, T_{31}, T_{32}$ is also referred to as a switching pattern in this context. In the course of the implementation of a switching pattern, each switch is typically opened at least once using a control pulse of pulse duration $\tau_k$ and then closed again within a control period AP that recurs at a control frequency $f_A$, whereby different desired output voltages $u_{out}$ can be generated. This procedure is well known in semiconductor technology and power electronics, in particular as PWM (pulse width modulation) technology. In the case shown in FIG. 1, a switching pattern is generated by the control unit 2 and implemented at the semiconductor switches $T_{01}, T_{02}, \ldots T_{31}, T_{32}$ using the electric control pulses mentioned. In this case, the control unit 2 can be implemented in particular by microprocessor-based hardware, microcontrollers, and/or integrated circuits (ASIC, FPGA). The control unit 2 objectively also records the target value $u^*_{out}$ to be realized for the output voltage $u_{out}$. Since, as mentioned, the method according to the embodiments is not limited to the topology shown in FIG. 1, other locations as output A are also conceivable.

In other words, any auxiliary capacitor $C_j$ can be bridged using the semiconductor switches $T_{01}, T_{02}, \ldots T_{31}, T_{32}$, connected in series to another capacitor, or connected in series to a plurality of other auxiliary capacitors. The counter variable j serves to index the auxiliary capacitors $C_0$, $C_1$, $C_2$ provided in the 5-level converter 1 under consideration. Depending on the switching states of the semiconductor switches $T_{01}, T_{02}, \ldots T_{31}, T_{32}$, various serial interconnections of different combinations of auxiliary capacitors $C_0$, $C_1$, $C_2$ are connected to the output A.

The semiconductor switches $T_{k1}, T_{k2}$ are each switched in a complementary manner, wherein the counter variable k is used to index the semiconductor switches shown. This means that one of the two switches is always open and the other is closed, whereby the semiconductor switches $T_{k1}, T_{k2}$ form a functionally related pair of semiconductor switches $T_{k1}, T_{k2}$. In the present case, it is therefore sufficient for a description of a given position of the switch pair of semiconductor switches $T_{k1}, T_{k2}$ of each of these switch pairs to show only the switch position of the upper (or lower) semiconductor switch $T_{k1}$ (or $T_{k2}$). An open semiconductor switch $T_{k1}$ is usually specified with "1" or "$T_{k1}=1$"; a closed semiconductor switch $T_{k1}$ on the other hand is specified with "0" or "$T_{k1}=0$". For a complete description of all the switch positions occurring in a multilevel converter 1, a series of digits "1" and "0" is common, for example "0110", wherein the digits from left to right represent the semiconductor switches $T_{k1}$ assigned from left to right. In the situation shown in FIG. 1, "0110" would therefore mean $T_{31}=0$, $T_{21}=1$, $T_{11}=1$, $T_{01}=0$.

In the structure shown in FIG. 1, the output filter AF is also connected to the output A of the 5-level converter 1. The output voltage $u_{out}$ is present at the output filter AF, which causes the output current $i_{out}$ to flow into the output filter AF. In the present case, the load current $i_L$ leaves the output filter AF, which load current $i_L$ subsequently supplies the load $Z_L$.

In cases of this type, the output filter AF is usually used to smooth the output voltage $u_{out}$ and output current $i_{out}$, but it can also be or include a known EMC (electromagnetic compatibility) filter. A preferred embodiment of an output filter AF is often given by a well-known LCL filter.

In principle, output filters AF are used to suppress interference signals which are also generated by converters in addition to the actually desired time curves of output variables. In the present context, interference signals mean in particular harmonics in the output voltage $u_{out}$ and the output current $i_{out}$, whereby harmonics in the present context are to be understood as frequency components of $u_{out}$ and $i_{out}$, the frequencies of which each correspond to an integral multiple of the control frequency $f_A$.

For this purpose, the output filter AF is usually dimensioned in such a way that a satisfactory suppression, in particular of the dominant harmonic of the load current $i_L$, is reached. The frequency of the dominant harmonic is usually given by the product of the number of switch pairs $T_{k1}, T_{k2}$ and the control frequency $f_A$ and is often referred to as the "fundamental tone." For harmonics, whose frequencies lie between the control frequency $f_A$ and the frequency of the fundamental tone, the term "undertone" is often used, including the following explanations. At this point, it should be emphasized that the output filter AF is not a necessary prerequisite for implementing the method according to the invention. In order to implement the method according to the invention, in addition to the output voltage $u_{out}$ and the output current $1_{out}$, measurements of electrical variables prevailing in the output filter AF can also be used, which is indicated in FIG. 1 by the variable x.

As mentioned, the auxiliary voltages $u_0$, $u_1$, $u_2$ play a substantial role in the operation of a multilevel converter 1. In the case of the 5-level converter 1 shown, it proves to be particularly advantageous to select the auxiliary voltages $u_0$, $u_1$, $u_2$ in such a way that the differences between the auxiliary voltages $C_0$, $C_1$ or $C_1$, $C_2$ dropping across two adjacent auxiliary capacitors $u_0$, $u_1$ or $u_1$, $u_2$ are always given by the auxiliary voltage $u_0$ of the output-side auxiliary capacitor $C_0$. If the same is also required for the difference between the voltage u of the voltage source S and the auxiliary voltage $u_2$ of the first input-side auxiliary capacitor $C_2$, this can be expressed mathematically by the equation $$u - u_2 = u_2 - u_1 = u_1 - u_0 = u_0$$

which is fulfilled in particular by the assignment $$u_0 = \frac{u}{4}, u_1 = \frac{2u}{4}, u_2 = \frac{3u}{4}.$$

These values are preferably also used as target or default values $u^*_0$, $u^*_1$, $u^*_2$ for the auxiliary voltages $u_0$, $u_1$, $u_2$. Target values $u^*_0$, $u^*_1$, $u^*_2$ for the auxiliary voltages $u_0$, $u_1$, $u_2$ can be passed on to the control unit 2, just like the target value $u^*_{out}$ for the output voltage $u_{out}$. It should be noted at this point that advantageous values for the auxiliary voltages can also be determined in the same way for other multilevel converters 1 with a different number of switching stages. However, the present invention in no way presupposes this preferred choice of auxiliary voltages $u_0$, $u_1$, $u_2$, and could also be used with differently selected target values $u^*_0$, $u^*_1$, $u^*_2$ for the auxiliary voltages $u_0$, $u_1$, $u_2$. However, an advantage of precisely this choice that is important in practice is that the resulting voltage levels are distributed evenly over the voltage interval from 0 to u, which can be represented with the output voltage $u_{out}$, which primarily allows for a fine-grained voltage generation in the entire voltage interval.

In general, for an N-level converter, which according to its designation has a number of N voltage levels, a corresponding choice could be represented as $$u^*_j = j \frac{u}{N-1}.$$

At this point, however, it should be noted again that the presented assignment of target values $u^*_j$ for the auxiliary voltages $u_j$ does not necessarily have to be the case, and that other target values $u^*_j$ could also be selected for an operation according to the invention of a multilevel converter 1, in particular since the method according to the invention, as mentioned, is not limited to the number of three auxiliary capacitors $C_0$, $C_1$, $C_2$ of the present embodiment. If the method according to the invention is used in a multilevel converter that has a different number of auxiliary capacitors, the same requirement for identical differences between the auxiliary voltages dropping across two adjacent auxiliary capacitors results in different default values for the auxiliary voltages.

There are multiple options for loading the auxiliary voltages in a multilevel converter 1 at the start of operation, for example to the specified target values $$u^*_j = j \frac{u}{N-1}$$

or to other target values. The given pairs of semiconductor switches $T_{k1}$, $T_{k2}$ can be switched to "1" at the start of operation, i.e. be switched to the switch position "1111." After the desired voltage level $u^*_j$ for the respective auxiliary capacitors $C_j$ has been reached, the pairs of semiconductor switches $T_{k1}, T_{k2}$ can be switched back to "0" starting from the right, i.e. from the output side, whereby the initially present interconnection of all auxiliary capacitors $C_j$ is dissolved one after another and the auxiliary voltages $u_j$ from the auxiliary capacitors $C_j$ no longer connected to the positive pole u of the voltage source S remain at a voltage level.

In the 5-level converter 1 shown, the presented selection of the auxiliary voltages from $$u_0 = \frac{u}{4}, u_1 = \frac{2u}{4}, u_2 = \frac{3u}{4}$$

results in sixteen possible control combinations with which the output voltage $v_{out}$ can be assigned the five voltage levels $$\left\{ 0, \frac{u}{4}, \frac{2u}{4}, \frac{3u}{4}, u \right\}.$$

While the lowest voltage level $u_{out}=0$ is reached with the switch combination "0000" and the highest voltage level $u_{out}=u$ is reached with the switch combination "1111", there are at least four different switch combinations for all other voltage levels.

Figure 2:
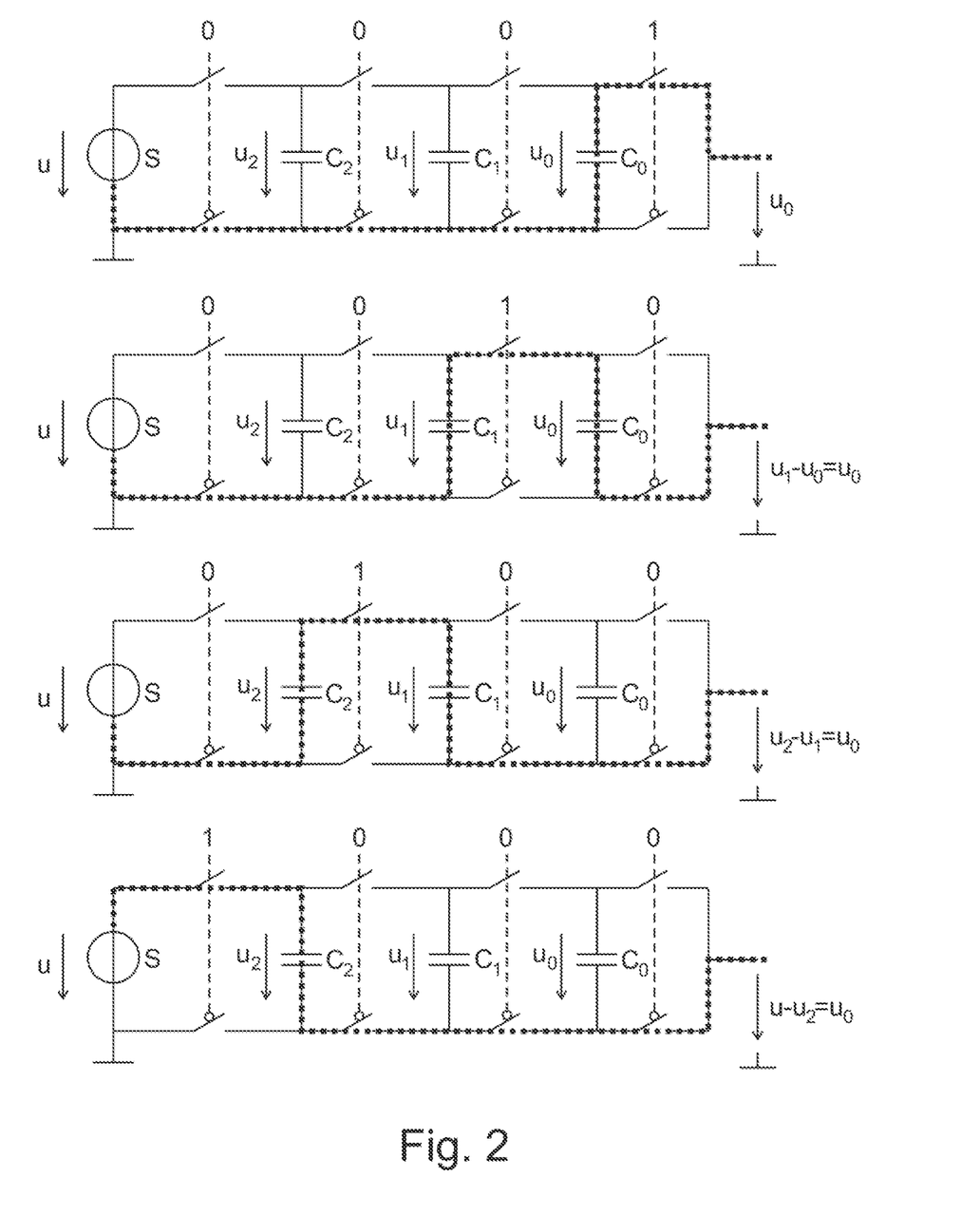
FIG. 2 shows switch combinations for the voltage level u/4 in the case of a 5-level converter.

How the same voltage level can be specifically generated with multiple switch combinations is shown in FIG. 2 on the basis of a more abstract consideration of the 5-level converter 1 in question. With the help of the switch combinations shown, four serial connections of the auxiliary capacitors $C_0$, $C_1$, $C_2$ are implemented, which result in four different connection paths between the auxiliary capacitors $C_0$, $C_1$, $C_2$, the voltage source S, and the output A. In the case shown in FIG. 2, all switch positions shown produce the same output voltage $$u_{out} = \frac{u}{4}.$$

Switch positions that result in the same output voltage are referred to in this context as "redundant switch positions" or "redundant switch combinations." It should be noted in this case that identical output voltages $u_{out}$ occur in these cases precisely when the equation mentioned above for equal voltage differences between the auxiliary voltages $u_0$, $u_1$, $u_2$ of two adjacent auxiliary capacitors $C_0$, $C_1$, $C_2$ is satisfied. If specific voltage levels are required at the output of the multilevel converter 1 in the course of a pulse width modulation (PWM) and if there are a plurality of redundant circuit combinations for these voltage levels, it is possible to continuously switch between these redundant circuit combinations within a control period AP in an advantageous manner and thus make a selective selection from the redundant circuit combinations. Since a plurality of smaller partial pulses usually result in the generated output variables within a control period AP, the residual ripple in the output variables generated by the multilevel converter 1 is reduced in particular. To implement this concept, however, it is crucial that all auxiliary voltages $u_0$, $u_1$, $u_2$ remain as constant as possible during operation and as close as possible to their target values.

For a more detailed explanation as to why adverse changes in the auxiliary voltages in real operation of multilevel converters 1 $u_0$, $u_1$, $u_2$ may occur, reference should first be made to the fact that an auxiliary capacitor $C_j$ is charged precisely when $T_{j+1,1} - T_{j,1} = 1$ applies for the difference in the switch positions of the adjacent semiconductor switches, and that it is discharged precisely when $T_{j+1,1} - T_{j,1} = -1$ applies for that very difference. The counter variable j serves in this case, as before, for indexing the auxiliary capacitors $C_0$, $C_1$, $C_2$ provided in the 5-level converter 1 under consideration. Typically, charging and discharging switch positions occur to the same extent for an auxiliary capacitor $C_j$ during a control period AP. If the durations of the resulting charging and discharging time sub-intervals are identical, and if that amount of charge that is taken from an auxiliary capacitor $C_j$, in the event of a corresponding discharge, is introduced back into the auxiliary capacitor $C_j$ by a charging process, a so-called balanced Charge balance is created over a control period AP, resulting in the same auxiliary voltages $u_0$, $u_1$, $u_2$ at the beginning and end of a control period AP.

Disturbances that occur in practice, such as component scattering of the semiconductor switches $T_{01}, T_{02}, \ldots T_{31}, T_{32}$ and load currents $i_L$ that change over time, often result in a deviation from this ideal situation. In particular, load currents $i_L$ that change over time can result in a difference between the charge withdrawal in a discharging phase of an auxiliary capacitor $C_j$ and the charge injection in a charging phase, which means that the auxiliary voltage $u_j$ dropping across the auxiliary capacitor $C_j$ can sometimes change significantly.

For these reasons, among others, the method according to the invention aims to improve the balance of auxiliary voltages during operation of multilevel converters in flycap topology 1. For this purpose, the invention uses the knowledge that, conversely, by deliberately modifying the pulse durations $\tau_k$ of the control pulses, which are used to open and close the semiconductor switches $T_{01}, T_{02}, \ldots T_{31}, T_{32}$, disturbances in the balance of the auxiliary voltages $u_0$, $u_1$, $u_2$ can be counteracted in a targeted manner.

Accordingly, the method according to the invention provides for the pulse durations $\tau_k$ of the respective control pulses for opening and closing the semiconductor switches $T_{01}, T_{02}, \ldots T_{31}, T_{32}$ to be increased or decreased, in a preferred manner by 1% to 10%, in a further preferred manner by 10% to 50%, and in a further preferred manner by 50% to 100% of their original value, so that the auxiliary capacitors $C_0$, $C_1$, $C_2$ are charged and discharged in such a way that there is a balanced charge balance on the auxiliary capacitors $C_0$, $C_1$, $C_2$, and the associated auxiliary voltages $u_0$, $u_1$, $u_2$ are thus kept constant and balanced.

To implement this modification of the pulse durations $\tau_k$ according to the invention, a remarkable finding is used, namely that there is a connection that is surprising and just as astonishing, but which is in particular analytically describable, between the harmonics of an output signal generated by a multilevel converter 1 and the auxiliary voltages dropping across its auxiliary capacitors $u_0$, $u_1$, $u_2$. This shows that, from the amplitudes and phase positions of the undertones, i.e. the harmonics of an output variable such as output voltage $u_{out}$ or output current $i_{out}$, the frequencies of which are between the control frequency $f_A$ and the frequency of the fundamental tone, the actual values of the auxiliary voltages $u_0$, $u_1$, $u_2$ dropping across the auxiliary capacitors $C_0$, $C_1$, $C_2$ can be inferred. In particular, it was recognized that vanishing amplitudes of the undertones in an output variable of a multilevel converter 1 such as that from FIG. 1 are equivalent to balanced, i.e. constant, auxiliary voltages. In the state of balanced auxiliary voltages $u_0$, $u_1$, $u_2$, it is particularly noteworthy that in this case output variables such as the output voltage $u_{out}$ only include frequency components, whose frequencies correspond to integral multiples of the frequency of the fundamental tone.

Figure 3:
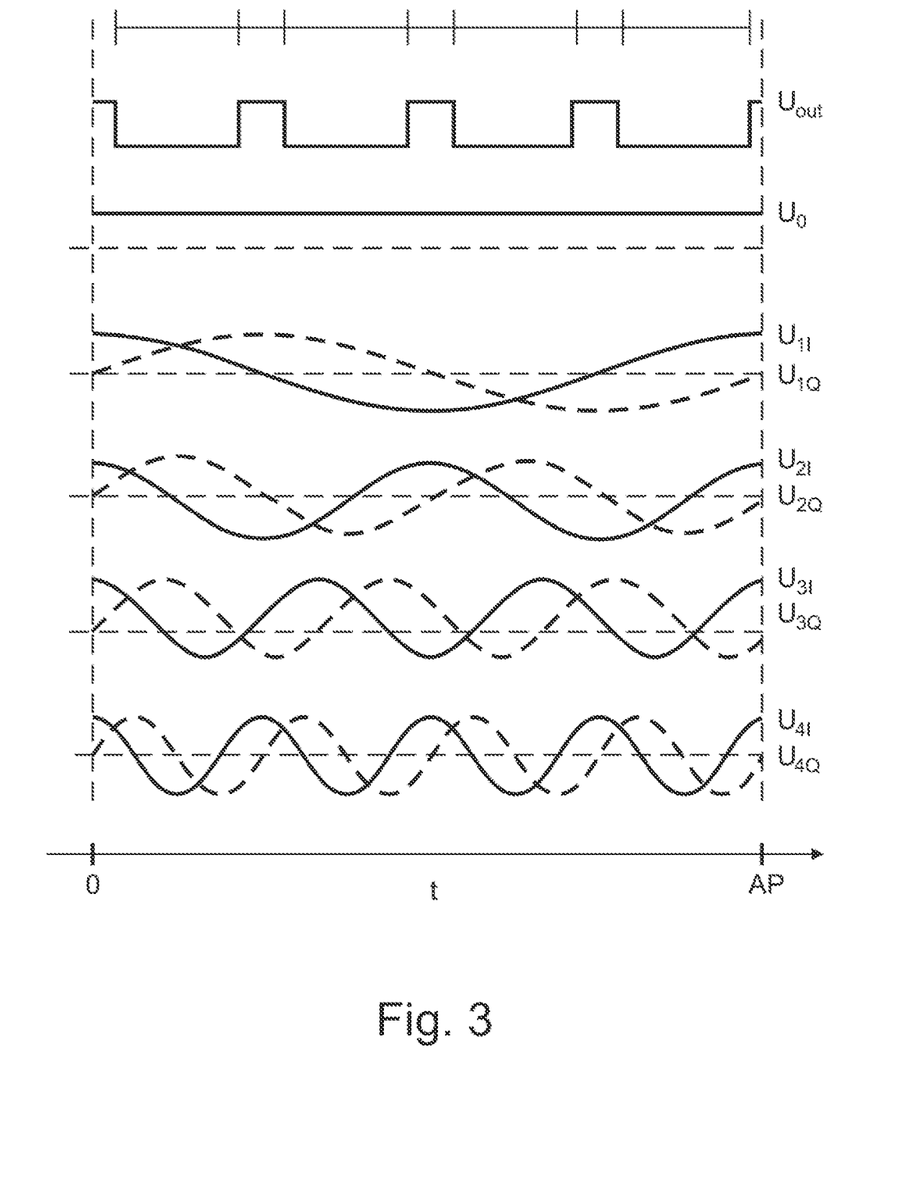
FIG. 3 shows a time course of an output voltage and the spectral decomposition thereof.

In order to describe this relationship and the implementation of the steps according to the invention in more detail, FIG. 3 shows a possible time course of an output variable and of four harmonics contained therein. Specifically, the first line of the diagram represents a possible time course of a resulting, pulsed output voltage $u_{out}$. A qualitative representation of the first four harmonics is shown in the following lines, whereby these are broken down into two sinusoidal or cosinusoidal components which are phase-shifted by 90 degrees with respect to one another, which is also known in literature as the IQ method. In an advantageous manner, these signal components can be selected in such a way that a zero crossing of one of these signal components, which are phase-shifted by 90 degrees with respect to one another, coincides with the beginning and with the end of a control period. The amplitudes or weights $U_{1I}$, $U_{1Q}$, $U_{2I}$, ... $U_{4I}$, $U_{4Q}$ are used in FIG. 3 to describe these signal components, which are phase-shifted by 90 degrees to one another, using suitable oscillation parameters which can be determined using a whole range of methods from signal processing. From the relevant literature, the (discrete) Fourier analysis or the IQ method mentioned should be mentioned in particular.

As mentioned, the harmonics are related to the auxiliary voltages $u_0$, $u_1$, $u_2$ and can be represented analytically.

Specifically, for signal components determined according to the IQ method and their weights $U_{1I}$, $U_{1Q}$, $U_{2I}$, ... $U_{4I}$, $U_{4Q}$ with the so-called degree of modulation m which represents the relation between the target output voltage $u^*_{out}$ and the maximum displayable output voltage u, i.e.

$$m = \frac{u^*_{out}}{u},$$

the relationship $$U_0 = mu$$

results for the direct component of the output voltage; the relationship $$U_{1I} = \frac{2}{\pi}\sin(\pi m)(u_0 - u_1 - u_2 + u), \quad U_{1Q} = \frac{2}{\pi}\sin(\pi m)(-u_0 - u_1 + u_2),$$

results for the first harmonic (PWM fundamental, first "undertone");
the relationship $$U_{2I} = \frac{1}{\pi}\sin(2\pi m)(-2u_0 - 2u_1 - 2u_2 + u), \quad U_{2Q} = 0$$

results for the second harmonic or the second undertone; and the relationship $$U_{4I} = \frac{2}{\pi}\sin(4\pi m) \cdot u, \quad U_{4Q} = 0$$

results for the fourth harmonic which also describes the fundamental tone of the output variable.

While the DC component and the fundamental tone only depend on the degree of modulation m, the undertones in particular also depend on the auxiliary voltages. At this point, it is easily seen that auxiliary voltages that remain constant at $$u_0 = \frac{u}{4}, u_1 = \frac{2u}{4}, u_2 = \frac{3u}{4}$$

cause the undertones of the output voltage to disappear.

The relationships shown make it clear that maintaining the charge balance on the auxiliary capacitors $C_0$, $C_1$, $C_2$ or balancing or keeping the auxiliary voltages $u_0$, $u_1$, $u_2$ constant is equivalent to suppressing the undertones. If the pulse durations $\tau_k$ are now modified or adjusted in such a way that balanced auxiliary voltages $u_0$, $u_1$, $u_2$ result at the specified target values, the weights $U_{1I}$, $U_{1Q}$, $U_{2I}$, $U_{2Q}$ are brought to zero. Conversely, weights $U_{1I}$, $U_{1Q}$, $U_{2I}$, $U_{2Q}$ brought to zero mean balanced auxiliary voltages. The balancing of auxiliary voltages and the suppression of undertones are therefore equivalent. This astonishing relationship can also be specified in an adapted form for other topologies of multilevel capacitors, for example with a different number of auxiliary capacitors or with different target values for the auxiliary voltages.

The pulse durations $\tau_k$ can be adjusted in a preferred manner by determining new, so-called correction pulse durations $\tau^*_k$ on the basis of the weights $U_{1I}$, $U_{1Q}$, $U_{2I}$, $U_{2Q}$.

The new correction pulse durations $\tau^*_k$ replace existing pulse durations $\tau_k$ for controlling the semiconductor switches $T_{k1}$, $T_{k2}$ and modify their opening and closing times in such a way that balanced auxiliary voltages $u_0$, $u_1$, $u_2$ are set. The correction pulse durations $\tau^*_k$ can only be used in a future method step to actually control a semiconductor switch $T_{01}$, $T_{02}$, ... $T_{31}$, $T_{32}$.

To implement the method according to the invention, it should be noted that the use of weights $U_{nI}$ and $U_{nQ}$ of two partial signals of a harmonic, which signals are phase-shifted by 90 degrees, wherein, from one of these partial signals, one zero crossing preferably coincides with the beginning and one zero crossing preferably coincides with the end of a control period, is just one of many approaches. In the case of the 5-level converter 1 in question, the counter variable η runs from one to four. The determination of correction pulse durations $\tau^*_k$ can take place just as well based on amplitude $U_\eta$ and phase position $\varphi_\eta$ of a total harmonic, wherein, as is well known, the relationship $U_{\eta I} = U_\eta \cdot \cos(\varphi_\eta)$ and $U_{\eta Q} = U_\eta \cdot \sin(\varphi_\eta)$ applies in this case, and thus the same information is transported by amplitude $U_\eta$ and phase position $\varphi_\eta$ as by the weights $U_{\eta I}$ and $U_{\eta Q}$.

In this case, the phase position of a harmonic describes its (temporal) shift at the start of a control period AP, for example by describing the (temporal) shift of the first zero crossing of the harmonic in a control period AP at the start of the control period AP.

Since in many cases the amplitude $U_\eta$ and the phase position $\varphi_\eta$ of a signal component can be determined more directly and easily than the presented weights $U_{\eta L}$ and $U_{\eta Q}$, the use of amplitude $U_\eta$ and phase position $\varphi_\eta$ represents a further advantageous embodiment of the method according to the invention. In general terms, at least one oscillation parameter is used to implement the method according to the invention, which parameter describes the oscillation behavior of at least one harmonic of the electrical measured variable x.

The description of the oscillation behavior is primarily understood as a description of the frequency and/or amplitude and/or phase position of a harmonic. In this sense, a suitable oscillation parameter can be implemented in many different ways, for example in the form of a complex amplitude, as is well known from complex AC calculations. If a complex amplitude is used to describe a harmonic, a single oscillation parameter may already be sufficient for describing a harmonic according to the invention.

Conversely, the auxiliary voltages $u_0$, $u_1$, $u_2$ can also be recalculated from the undertones by solving a system of equations. Since the system only has 3 degrees of freedom $u_0$, $u_1$, $u_2$, just as many spectral components, i.e. amplitudes or weights of harmonics, are required. In a particularly advantageous embodiment of the method according to the invention, the bijective relationship $$u_0, u_1, u_2 \leftrightarrow U_{1I}, U_{1Q}, U_{2I}$$

is used in this sense, for example in the form of a system of equations consisting of the above equations, in order to first determine estimated values $\hat{u}_0$, $\hat{u}_1$, $\hat{u}_2$ of the auxiliary voltages $u_0$, $u_1$, $u_2$ from oscillation parameters such as $U_{1I}$, $U_{1Q}$, $U_{2I}$, said estimated values corresponding to the above relationship. At this point, as already mentioned earlier, it should be noted that the specific number of auxiliary capacitors and the specific number of auxiliary voltages associated therewith are not decisive for the applicability of the method according to the invention. In the case of a larger number of auxiliary capacitors, only a correspondingly larger number of auxiliary voltages and a correspondingly larger number of weights of undertone amplitudes would have to be used, and the relationship between auxiliary voltages and harmonics, i.e. undertones and fundamental tone, would have to be adapted to the given situation.

The estimated values $\hat{u}_0$, $\hat{u}_1$, $\hat{u}_2$ can then be compared with target values $u^*_0$, $u^*_1$, $u^*_2$ provided for them, which are specified, for example, by an operator or a higher-level control loop. In the present case, the presented choice $$u^*_0 = \frac{u}{4}, u^*_1 = \frac{2u}{4}, u^*_2 = \frac{3u}{4}$$

can be advantageously used as target values $u^*_0$, $u^*_1$, $u^*_2$, whereby, as already mentioned, an optionally different choice of target values does not constitute a limitation of the present invention.

Finally, the deviations $e_0 = u^*_0 - \hat{u}_0$, $e_1 = u^*_1 - \hat{u}_1$, $e_2 = u^*_2 - \hat{u}_2$ resulting from this comparison between target and estimated values can be used to set the correction pulse durations of the control pulses, for which, for example, a suitable controller output variable is calculated using a controller transfer function from the determined deviations $e_0 = u^*_0 - \hat{u}_0$, $e_1 = u^*_1 - \hat{u}_1$, $e_2 = u^*_2 - \hat{u}_2$, which variable describes the correction pulse durations for future control of the semiconductor switches. To carry out this step, a wide variety of procedures from control engineering can in turn be used.

A general suppression of harmonics, as is made possible by the method according to the invention, results in a number of significant advantages in practical operation, in particular with regard to the output filter AF that is usually to be provided in the case of a mains feed. In the simplest case, the output filter AF is an LCL low-pass filter, the cut-off frequency of which is designed to suppress the fundamental tone. A reduction in the cut-off frequency to the undertones would be directly associated with increased material and space requirements for the filter. In order to be able to suppress the undertones, an ohmic resistor would also be necessary in many cases in an output filter AF, which resistor would drastically reduce the efficiency of the converter 1 and subsequently require additional space for appropriate cooling.

Another serious disadvantage of insufficient suppression of undertones in the load current $i_L$ is that in many cases this can further increase an unbalanced and/or time-varying load on the multilevel converter, which can represent a possible cause for a lack of charge imbalance. This in turn can result in positive feedback in which the unbalanced loading of the multilevel converter 1 results in an increased charge imbalance, and the increased charge imbalance in turn increases the load asymmetry. The behavior of the entire multilevel converter 1 can thus become unstable or chaotic. The controlled suppression of the undertones is therefore substantial for the practical use of multilevel converters.

Figure 4:
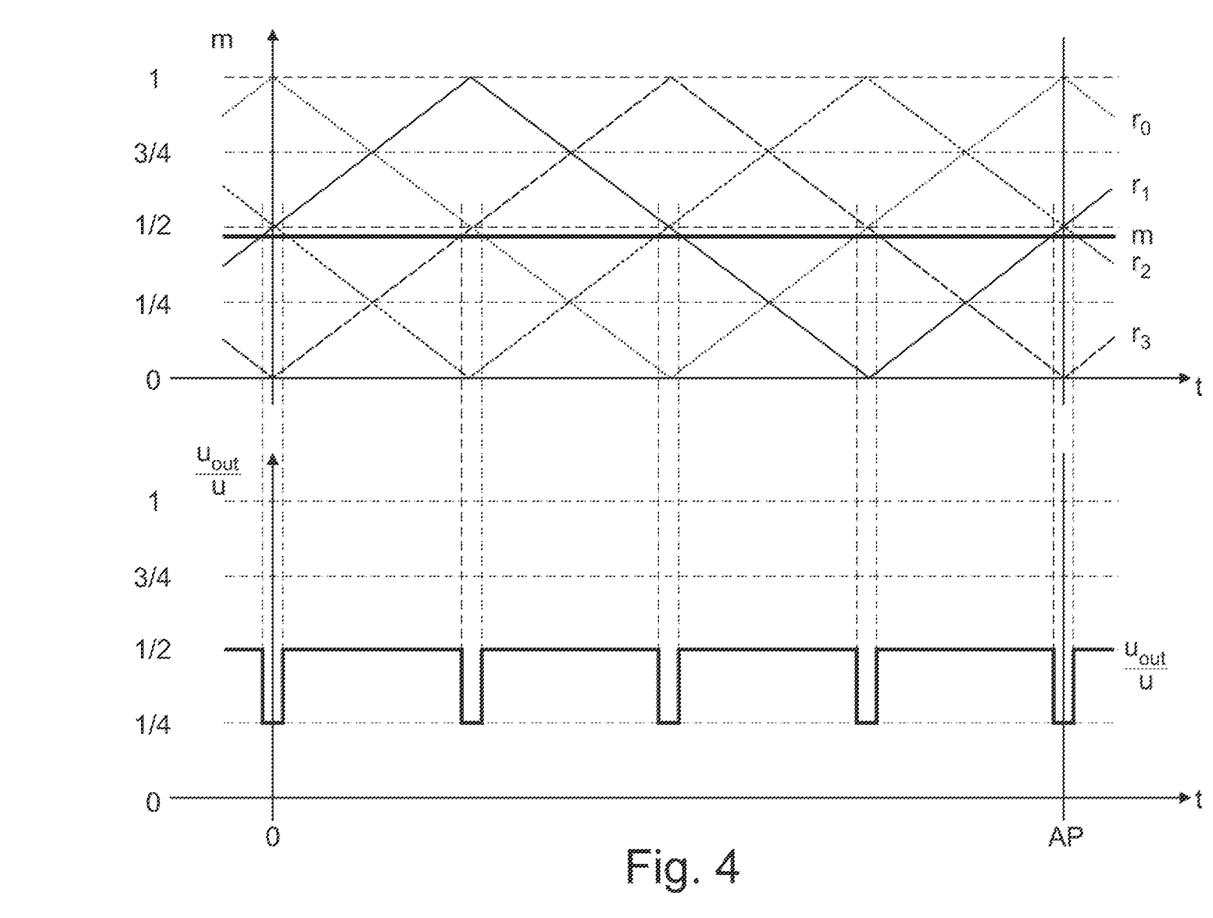
FIG. 4 shows a first course of control pulses.

One way in which the pulse durations $\tau_k$ of the control pulses for opening and closing the respective semiconductor switches $T_{k1}$, $T_{k2}$ can be specifically determined in order to subsequently modify them according to the method according to the invention is shown in FIG. 4. In the embodiment shown, the degree of modulation m is used again, which as before stands for the relation of target output voltage $u^*_{out}$ and maximum representable output voltage u, i.e.

$$m = \frac{u^*_{out}}{u}.$$

In particular, a target value to be realized $u^*_{out}$ can be represented by the degree of modulation m. The procedure shown can preferably be implemented in the control unit 2.

Figure 5:
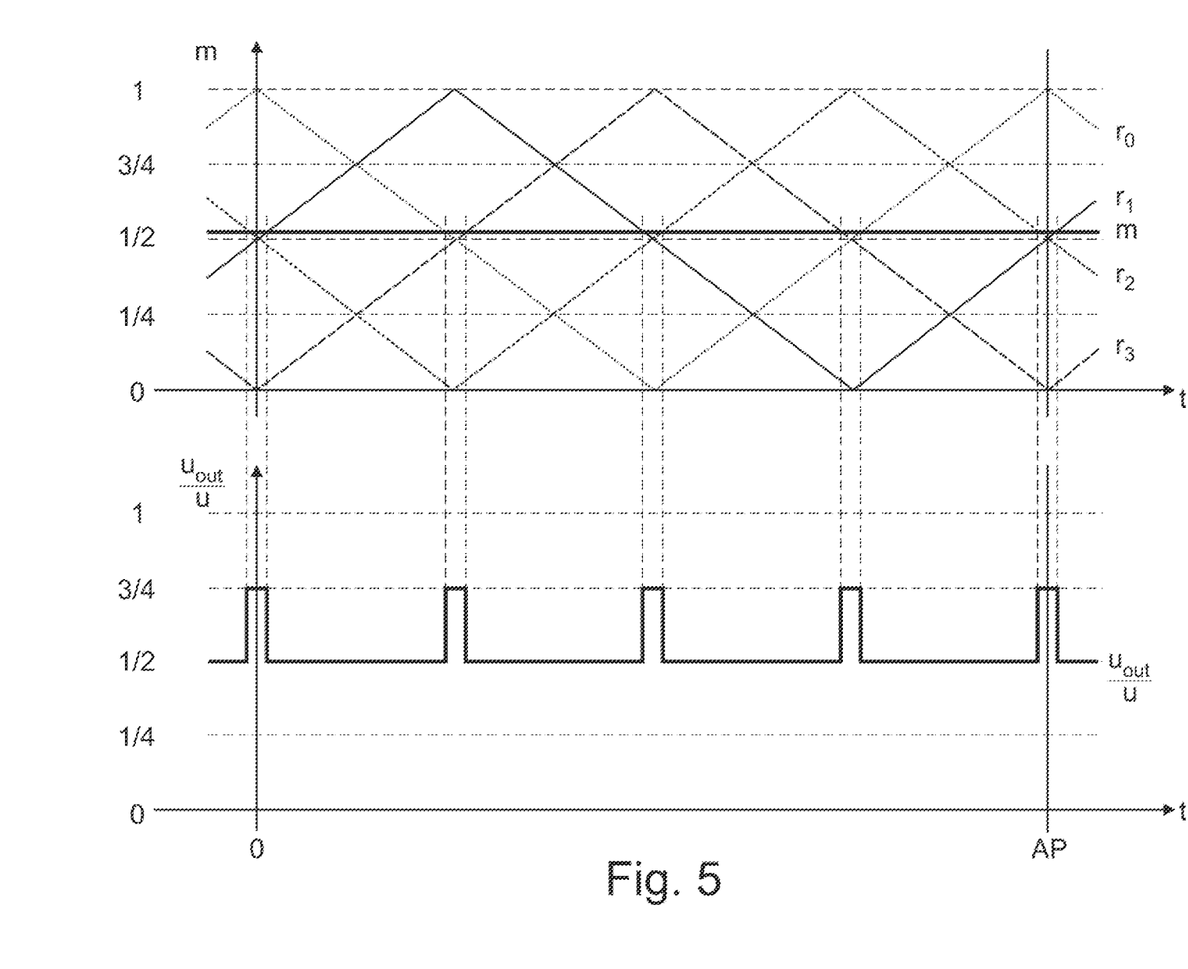
FIG. 5 shows a second course of control pulses.

In FIG. 4, comparison signals $r_k$ assigned to the respective semiconductor switches are compared with the degree of modulation m, with a semiconductor switch $T_{k1}$ being controlled and thus opened when the comparison signal $r_k$ assigned thereto, hereinafter also referred to as "travelling wave," is greater than m, and otherwise remains closed. The respective traveling waves $r_k$ are phase-shifted in relation to one another in such a way that identical signal sections are distributed in the various traveling waves $r_k$ at equal time intervals over a control period AP. An idealized course of an output voltage $u_{out}$ generated by this procedure is shown in the lower half of the diagram using signal $u_{out}$. Since the desired voltage is just below the voltage level $$\frac{u}{2}$$

in the specific example, the voltage levels $$\frac{u}{2} \text{ and } \frac{u}{4}$$

alternate in pulses in me output variable. What happens in a case where the desired output voltage is just above an available voltage level, is shown in FIG. 5. Contrary to the situation from FIG. 4, the target voltage given in this case slightly above the voltage level $$\frac{u}{2}$$

causes a continuous change between the voltage levels $$\frac{u}{2} \text{ and } \frac{3u}{4}$$

in the output variable.

Figure 6:
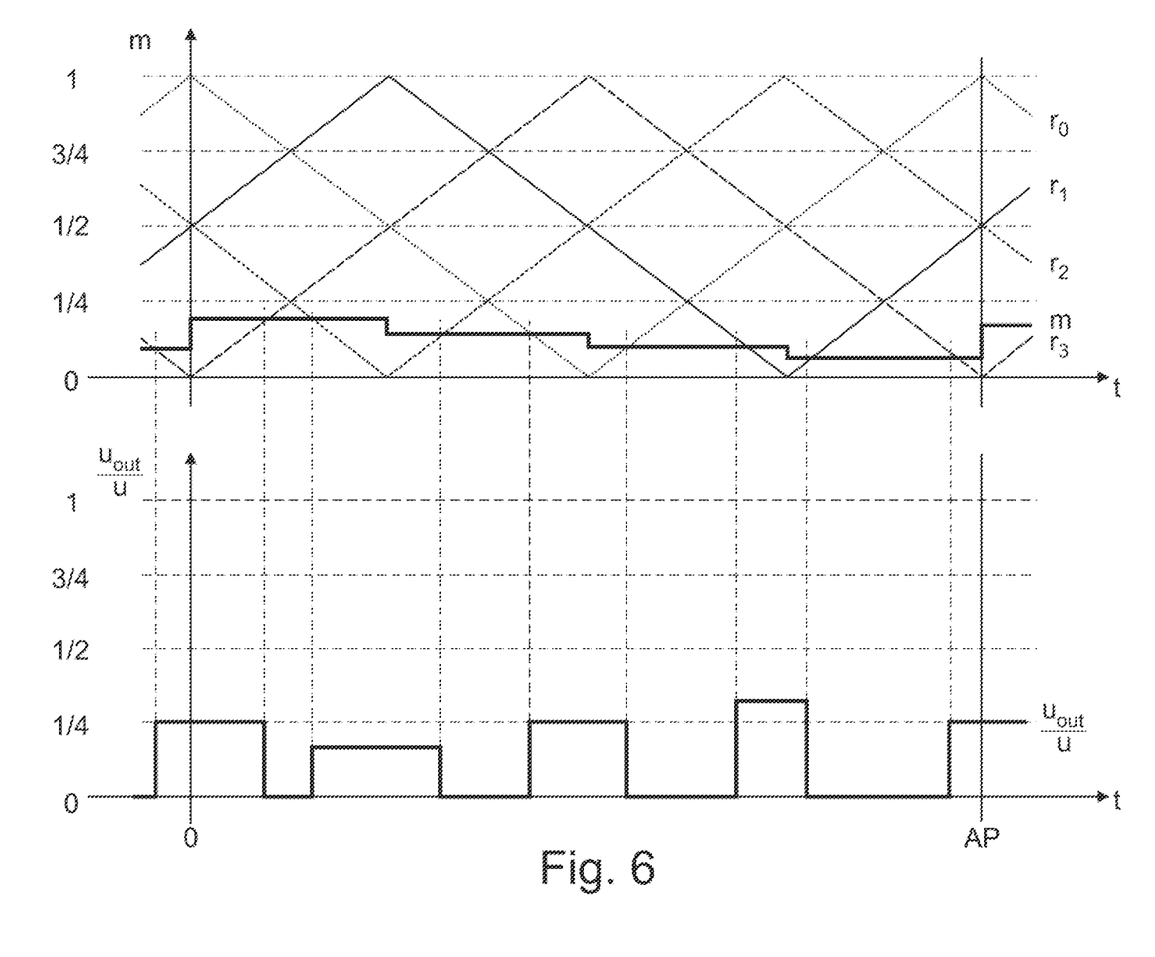
FIG. 6 shows a third course of control pulses when using the method according to the invention.

The method according to the invention can now make use of a change in the degree of modulation m within a control period AP in an advantageous manner in order to bring about the adaptation of the pulse durations $\tau_k$ according to the invention. What such a course of a degree of modulation m that changes during a control period AP can look like is shown in FIG. 6. The result is output voltage pulses with different pulse durations $\tau_k$, by means of which the voltage-time area required by a conventionally superimposed PWM is nevertheless generated in the control period AP, but at the same time the balance of the auxiliary voltages $u_0$, $u_1$, $u_2$ according to the invention is also achieved. In order to implement a degree of modulation m that changes within a control period AP, a plurality of approaches can be used. For this purpose, a time-varying modulation degree m(t) or m[n] with the discrete time index n or a plurality of degrees of modulation $m_0$, $m_1$, $m_2$, $m_3$ that are constant over a corresponding control period AP and that are assigned to the switch pairs $T_{k1}$, $T_{k2}$ are conceivable.

Figure 7:
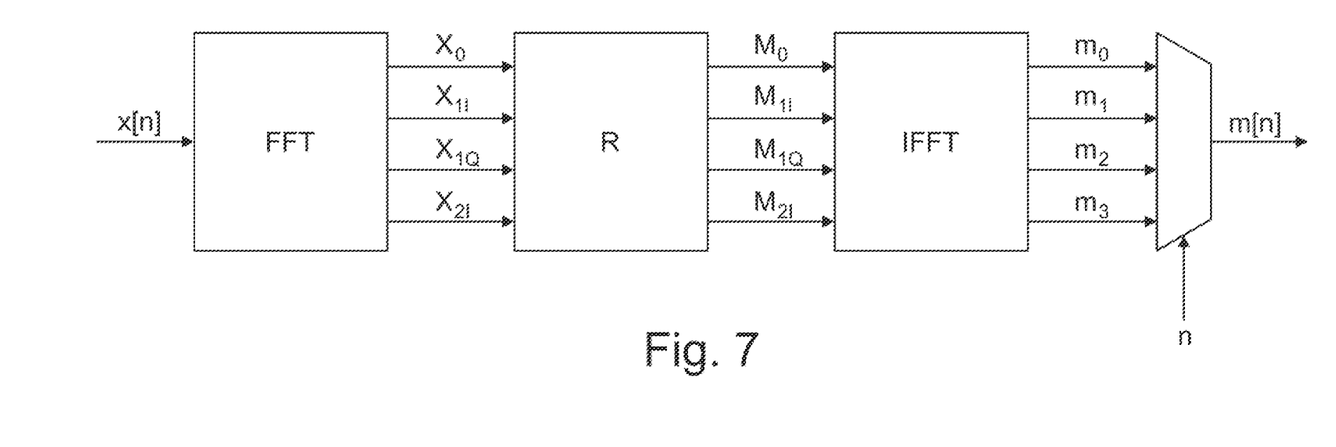
FIG. 7 is a first block diagram for implementing the method according to the invention.

FIG. 7 also shows how the method according to the invention can be implemented using a block diagram. The measurement signal x[n] preferably represents the output voltage $u_{out}$ or the output current $i_{out}$, measured at points in time $t_n$ defined by the discrete time index n. From the measurement signal x, the spectral components $X_0$, $X_{1I}$, $X_{1Q}$ and $X_{2I}$ are first determined as oscillation parameters using the FFT ("Fast Fourier Transformation") block. The main element of the block diagram is the control operator R shown as a block in FIG. 7, which determines the spectral components $M_0$, $M_{1I}$, $M_{1Q}$, $M_{2I}$ of the degree of modulation m from the spectral components or oscillation parameters $X_0$, $X_{1I}$, $X_{1Q}$, $X_{2I}$ of the measurement signal. In the specific case, this control operator R can without restriction be interpreted as a 4×4 matrix. In many cases, it is advantageous to use a pure diagonal matrix as the control operator R. In this case, this can be represented, for example, by an LTI (multivariable) system, which allows an efficient implementation, preferably in the form of a discrete, linear, and often time-invariant filter.

In the case shown in FIG. 7, the individual degrees of modulation $m_0$, $m_1$, $m_2$, $m_3$ are determined using the block IFFT, which represents a vector-valued, inverse Fourier transformation. As shown by the multiplexer block in FIG. 7, these individual degrees of modulation $m_0$, $m_1$, $m_2$, $m_3$ are converted in a further step into a degree of modulation m[n] that changes over time.

In a further advantageous embodiment of the method according to the invention, an average degree of modulation $\overline{m}$ can be specified, which ensures that the DC component $X_0$ follows a target value, for example $u^*_{out}$. Based on the invention described, an average degree of modulation $\overline{m}$ of this type can be varied piece by piece in a further step based on individual degrees of modulation $m_0$, $m_1$, $m_2$, $m_3$, and can be subsequently shown using a time-changing course of the degree of modulation m[n], as shown for example in FIG. 6. As mentioned, a comparison of such a time course of the degree of modulation m[n] with one or more traveling waves $r_k$ can be used to determine the desired correction pulse durations $\tau^*_k$ which keep the auxiliary capacitors and thus the auxiliary voltages dropping across them in balance.

Figure 8:
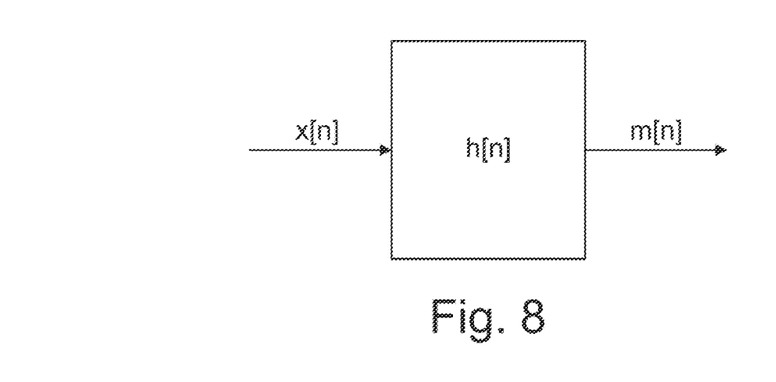
FIG. 8 is a second block diagram for implementing the method according to the invention.

In a preferred embodiment, the blocks FFT, control operator R, and IFFT can also be concentrated into one block, which is shown in FIG. 8. The middle block is characterized by the impulse response h[n] and summarizes the mentioned FFT, control operator R, and IFFT. The steps previously carried out in the separate blocks can thus be carried out, for example, by means of the mathematical operation of convolution, which is well known from control engineering, wherein the measurement signal x[n] is convolved with the impulse response h[n], which in turn can be used to determine a time course of a degree of modulation m[n], from which, as shown in FIG. 4, FIG. 5, and FIG. 6, the correction pulse durations $\tau^*_k$ ultimately sought can be determined by a comparison with traveling waves $r_k$. This approach allows the at least one correction pulse duration $\tau^*_k$ to be determined from the electrical measured variable x using a convolution operation in which the electrical measured variable x is convolved with an impulse response derived from the at least one oscillation parameter. The impulse response can preferably be derived from an oscillation parameter, which contains information about the frequency of the harmonic it describes, in that said impulse response is selected in such a way that the loop amplification of the control loop from the correction pulse duration $\tau^*_k$ to the measured variable x and back to the correction pulse duration $\tau^*_k$ lays at a pole, i.e. assumes a very large amplification, but at least an amplification greater than one, at the frequency of the harmonic described by the oscillation parameter.

In an advantageous embodiment, in order to suppress a plurality of harmonics, a plurality of poles located at the frequencies of said plurality of harmonics are introduced into the above-mentioned loop. Various approaches from control engineering can also be used to design the impulse response on the basis of one or more oscillation parameters, such as H-infinity control, repetitive control, or other control design methods based on optimization. An impulse response of this type, which can also be implemented as a z-transfer function or as a digital filter, among other things, is preferably designed before the start of operation of the multilevel converter and is no longer changed during operation. In certain cases, however, it can also be advantageous to adapt such an impulse response during operation and, for example, to adapt it to changing oscillation parameters.

A block diagram for implementing the method according to the invention, as shown in FIG. 7 or FIG. 8, can preferably be implemented on the control unit 2 which records the measurement data of the measured variable x according to the invention, which performs the calculations corresponding to the block diagram and outputs the desired, adjusted correction pulse durations $\tau^*_k$, optionally on the basis of a previously calculated course of a degree of modulation m[n], as shown in FIG. 4, FIG. 5, and FIG. 6. Assuming that a linear output filter AF (LTI system, for example in the form of an LCL filter) is connected to the output of the multilevel converter 1, the overtones of voltages and currents entering or leaving the output filter AF are always linked by a complex-valued, so-called undertone impedance. The reaction of the load $Z_L$ on the undertone impedances is negligible in most cases relevant to practice, which is why it is irrelevant whether a voltage or a current is measured at the input or output of the output filter AF for carrying out the method according to the invention. It is crucial that the point at which the measurement is taken is electrically connected to the output. A linear combination of a plurality of measured variables is also conceivable, which can bring advantages in particular with regard to the signal-to-noise ratio ("SNR").

In addition to the above-described control unit 2, which can be implemented in particular by microprocessor-based hardware, microcontrollers, and/or integrated circuits (ASIC, FPGA), control unit 2 can be implemental digitally, as software on microprocessor-based hardware. Thus, control unit 2 can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies, and/or analog instrumentation, e.g., analog electric/electronic circuits, analog computers, analog devices, etc. Further, the switching pattern to be generated by control unit 2 which can be implemented by microprocessors or similar components, programmed using software (e.g., microcode) to perform various functions discussed herein and may optionally be driven by firmware and/or software. Alternatively, control unit 2 may be implemented by dedicated hardware, or as a combination of dedicated hardware to perform some functions and a processor (e.g., one or more programmed microprocessors and associated circuitry) to perform other functions.

At least one memory (not shown), e.g., a non-transitory computer readable medium or media, can be provided to store one or more sets of instructions to perform any of the methods or computer-based functions disclosed herein, either alone or in combination with the other described devices. The at least one memory, accessible by the processors, can be part of the controller or remote from the controller, e.g., a remotely located server, memory, system, or communication network or in a cloud environment.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for operating a multilevel converter in flycap topology, the multilevel converter having at least two semiconductor switches controlled by control pulses of variable pulse durations within a control period that recurs at a control frequency to selectively interconnect a voltage source connected to an input of the multilevel converter, an output of the multilevel converter, and at least one auxiliary capacitor arranged between the input and the output of the multilevel converter, for generating an output voltage of the multilevel converter, such that an auxiliary voltage is formed on the at least one auxiliary capacitor and at least one electrical voltage or at least one electrical current is measured as an electrical measured variable at a point that is electrically connected to the output of the multilevel converter, the method comprising:

using at least one oscillation parameter derived from the electrical measured variable, the oscillation parameter describing oscillation behavior of at least one harmonic of the electrical measured variable and a frequency of the harmonic corresponding to an integral multiple of the control frequency;

determining at least one correction pulse duration for a future control pulse to reduce an amplitude of the at least one harmonic, and controlling at least one of the semiconductor switches with a control pulse of the determined correction pulse duration.

2. The method according to claim 1, wherein, to determine the at least one correction pulse duration from the at least one oscillation parameter, the method further comprises determining at least one estimated value of an auxiliary voltage dropping across the at least one auxiliary capacitor is determined; determining a deviation between the at least one estimated value and a target value that is specified for the auxiliary voltage described by the at least one estimated value; and wherein the determined deviation is used to determine the at least one correction pulse duration.

3. The method according to claim 2, wherein the at least one estimated value of the auxiliary voltage dropping across at least one auxiliary capacitor is determined by solving a system of equations, in which the at least one oscillation parameter is taken into account as a known variable.

4. The method according to claim 2, wherein the determination of the at least one correction pulse duration based on the deviation between the at least one estimated value and the target value that is specified for the auxiliary voltage described by at least the one estimated value takes place by a control operator that maps the determined deviation to a controller output variable, wherein at least one correction pulse duration is determined from the controller output variable, where duration is assigned to at least one semiconductor switch provided in the multilevel converter, and wherein the correction pulse duration determined is subsequently used in order to control the at least one semiconductor switch.

5. The method according to claim 1, wherein the at least one correction pulse duration is determined from the electrical measured variable using a convolution operation in which the electrical measured variable is convolved with an impulse response derived from the at least one oscillation parameter.

6. The method according to claim 1, wherein at least one of a frequency, an amplitude or a phase position of the at least one harmonic of the electrical measured variable is determined as an oscillation parameter to describe the oscillation behavior of the at least one harmonic of the electrical measured variable.

7. The method according to claim 6, wherein the phase position of the at least one harmonic describes a time shift of the at least one harmonic to a beginning of a control period.

8. The method according to claim 1, wherein a frequency and/or, in accordance with an IQ method, two amplitudes of two signal components, which are phase-shifted by 90 degrees with respect to one another, of the at least one harmonic of the electrical measured variable are determined as an oscillation parameter to describe the used behavior of the at least one harmonic of the electrical measured variable.

9. A multilevel converter in flycap topology according to claim 8, wherein a control unit is coupled to use the at least one oscillation parameter derived from the electrical measured variable to determine the at least one correction pulse duration for the future control pulse to reduce the amplitude of the at least one harmonic and to control the at least one of the semiconductor switches with the at least one control pulse with the determined correction pulse duration.

10. A multilevel converter in flycap topology having an input and an output, the multilevel converter comprising:

at least two semiconductor switches, which are controllable by control pulses of variable pulse durations within a control period that recurs at a control frequency;

at least one auxiliary capacitor selectively interconnected between the input and the output via the at least two semiconductor switches;

a voltage source connected to the input, the output and the at least one auxiliary capacitor for generating an output voltage, wherein an auxiliary voltage is formed at the at least one auxiliary capacitor, and wherein at least one electrical voltage or at least one electrical current as an electrical measured variable at a point which is electrically connected to the output is detectable, wherein at least one oscillation parameter derived from the electrical measured variable, the at least one oscillation parameter describing an oscillation behavior of at least one harmonic of the electrical measured variable, where the frequency of the harmonic corresponds to an integral multiple of the control frequency, is used to determine at least one correction pulse duration for a subsequent control pulse to reduce an amplitude of the at least one harmonic and to control at least one of the semiconductor switches with the at least one control pulse with the determined correction pulse duration.

\* \* \* \* \*